United States Patent
Lehtinen et al.

(10) Patent No.: US 7,242,954 B2
(45) Date of Patent: Jul. 10, 2007

(54) MULTIPLE LEVEL POWER CONTROL COMMAND SIGNALING

(75) Inventors: Otto-Aleksanteri Lehtinen, Raisio (FI); Petri Petronen, Oulu (FI); Janne Kurjenniemi, Jyväskylä (FI)

(73) Assignee: Nokia Siemens Networks Oy, Expoo (FI)

( * ) Notice: Subject to any disclaimer, the term of this patent is extended or adjusted under 35 U.S.C. 154(b) by 581 days.

(21) Appl. No.: 10/435,531

(22) Filed: May 9, 2003

(65) Prior Publication Data

US 2003/0224813 A1  Dec. 4, 2003

Related U.S. Application Data

(60) Provisional application No. 60/423,650, filed on Nov. 1, 2002, provisional application No. 60/379,936, filed on May 9, 2002.

(51) Int. Cl.
*H04Q 7/20* (2006.01)
(52) U.S. Cl. .................. 455/522; 455/513; 455/512; 455/69; 455/88; 455/92; 370/331; 370/335
(58) Field of Classification Search ................ 455/552, 455/423; 370/335, 342
See application file for complete search history.

(56) References Cited

U.S. PATENT DOCUMENTS

| | | | | |
|---|---|---|---|---|
| 5,896,411 | A * | 4/1999 | Ali et al. ..................... | 375/130 |
| 5,898,682 | A * | 4/1999 | Kanai .......................... | 370/331 |
| 5,924,043 | A | 7/1999 | Takano ........................ | 455/522 |
| 6,236,865 | B1 | 5/2001 | Lu .............................. | 455/522 |
| 6,334,047 | B1 | 12/2001 | Andersson et al. ........... | 455/69 |
| 6,760,598 | B1 * | 7/2004 | Kurjenniemi ................ | 455/522 |
| 2001/0002905 | A1 * | 6/2001 | Funamori ..................... | 370/342 |
| 2001/0010686 | A1 * | 8/2001 | Kubo et al. .................. | 370/335 |
| 2002/0068534 | A1 * | 6/2002 | Ue et al. ....................... | 455/92 |
| 2002/0160797 | A1 * | 10/2002 | Uehara et al. .............. | 455/522 |
| 2002/0173330 | A1 * | 11/2002 | Kojima et al. .............. | 455/522 |
| 2003/0003905 | A1 * | 1/2003 | Shvodian ..................... | 455/423 |
| 2003/0050057 | A1 * | 3/2003 | Shirai .......................... | 455/423 |
| 2003/0058823 | A1 * | 3/2003 | Nishimura ................... | 370/335 |
| 2003/0195012 | A1 * | 10/2003 | Baker et al. ................. | 455/522 |
| 2004/0142692 | A1 * | 7/2004 | Schwarz et al. ............. | 455/442 |

(Continued)

OTHER PUBLICATIONS

"3rd Generation Partnership Project; Technical Specification Group Radio Access Network; Requirements for Support of Radio Resources Management"; 3GPP TS 25.123, V4.3.0 (Dec. 2001); Valbonne, France; 2002; pp. 1-151.

(Continued)

*Primary Examiner*—Joseph Feild
*Assistant Examiner*—David Q. Nguyen
(74) *Attorney, Agent, or Firm*—Ware, Fressola, Van Der Sluys & adolphson LLP

(57) ABSTRACT

A method of adjusting downlink transmission power at a base station based on the measured SIR relative to a referenced level in a mobile terminal. The referenced level can be the targeted SIR or zero. When the measured SIR is greater than the referenced level, the measured SIR is further compared to a first threshold value in order to determine the step size for power reduction. When the measured SIR is smaller than the referenced level, the measured SIR is further compared to a second threshold value in order to determine the step size for power increase. The first and second threshold values can be derived from the target SIR and TPC step size as provided in the RRC signal. Furthermore, the step values and threshold can be based on statistical analysis while the system is running.

13 Claims, 8 Drawing Sheets

OTHER PUBLICATIONS

"3rd Generation Partnership Project; Technical Specification Group Radio Access Network; Physical Layer Procedures"; 3GPP TS 25.224, V4.3.0 (Dec. 2001); Valbonne, France; 2001; pp. 1-41.

"3rd Generation Partnership Project; Technical Specification Group Radio Access Network; Physical channels and mapping of transport channnels into physical channels"; 3GPP TS 25.221, V4.3.0 (Dec. 2001); Valbonne, France; 2001; pp. 1-88.

* cited by examiner

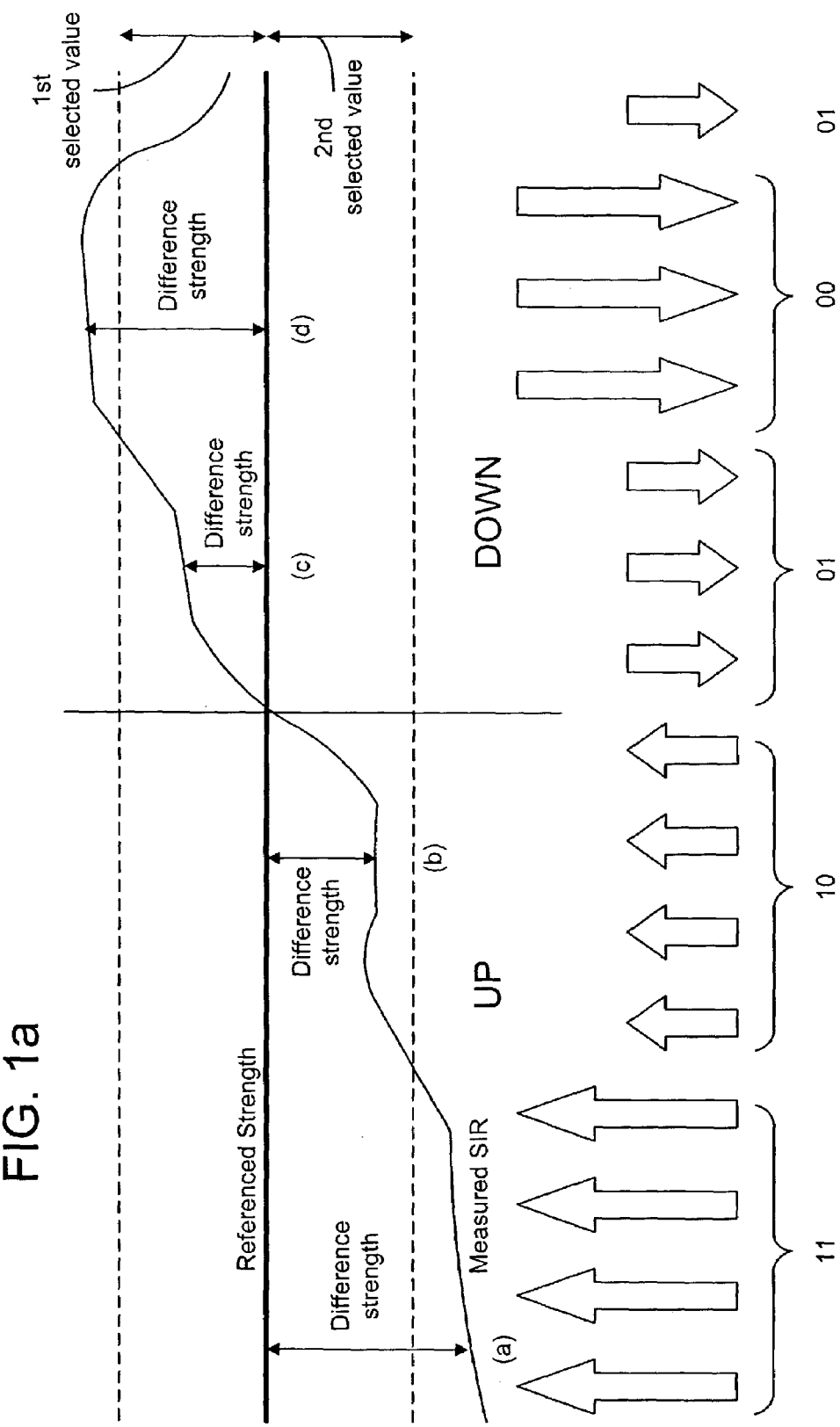

MULTIPLE LEVEL POWER CONTROL COMMAND SIGNALING

This application is based on and claims priority of U.S. Provisional application No. 60/379,936, filed May 9, 2002 and U.S. Provisional application No. 60/423,650, filed Nov. 1, 2002.

FIELD OF THE INVENTION

The present invention relates generally to power control in a telecommunication network and, more particularly, to power control in the closed inner loop.

BACKGROUND OF THE INVENTION

The present invention relates to inner closed loop power control. Although not restricted thereto, it is particularly useful in a WCDMA TDD (Wideband Code Division Multiple Access Time Division Duplex) system. It can therefore be usefully applied to the UTRA (Universal Terrestrial Radio Access) TDD downlink (DL) inner loop power control being deployed according to standards developed by the 3GPP (3rd Generation Partnership Project for producing WCDMA standards).

Inner closed loop power control is used in the UTRA for DL, in which UE (User Equipment) measures signal-to-interference ratio (SIR) and according to that measurement sends transmission power control command (TPC) to a base station (BS). The base station may adjust its transmission power according to a TPC command send by the UE with a power control step that is signaled from RNC (Radio Network Control) when it is within the range of operation.

In UTRA TDD users are separated in both code and time domain. Due to this time division mode channel conditions can fluctuate significantly. Unlike WCDMA FDD inner loop power control that has speed of 1500 Hz, the slow power control speed (100 Hz) in UTRA TDD is unable to counter fast channel fading. Downlink power control performance can be enhanced by increasing inner loop power control command rate, but a fast inner loop would ruin the TDD asymmetry and dynamic nature of the system. Although UTRA FDD (Frequency Division Duplex), uses the same kind of closed loop power control as in TDD, it does not require multiple steps because transmission is continuous and power control commands can be sent in every slot thus power control can follow channel conditions even with fixed steps.

According to current 3GPP specifications downlink power control step size is signaled from RNC to the base station, called Node B in the 3G WCDA system. Currently only one step size is signaled from RNC to the base station concurrently. The step size cannot be changed fast enough to react to changes in channel conditions and interference situations.

In TDD the fast fading is presently countered by transmitting excess power to counter the fading and compensate for the slow control loop. This naturally leads to extensive inter-cell interference conditions. Currently, inner closed loop power control uses a power control word for UP and DOWN. These commands are signaled according to 3GPP Release 4 standard with two bits 11 and 00 for providing maximum error distance. This decision is made based on comparison to a SIR threshold.

A problem with this signaling scheme occurs when the rate of the channel change is faster than the power control feedback rate. New signaling schemes could be devised to effect a different power control methodology but there would then be no solution or rules on how old equipment would judge and act when receiving a signaling bit combination that would not be recognized as a valid power control word.

SUMMARY OF THE INVENTION

It is a first object of the present invention to improve the ability to address rapidly changing power requirements. According to a first aspect of the present invention, adaptive step sizes are used, to react to these fast changes, and a signaling solution is provided to incorporate variable or adaptive step sizes, wherein the signaling solution is made backward compatible with a pre-existing standard. In further accord with the first aspect of the present invention, an appropriate step selection is made and used in order to compensate for the lack of speed. This way UL feedback is minimized and UE battery consumption is reduced longer talk times can be achieved. Furthermore, by choosing an appropriate step size to better follow and compensate for the variation in channel fading, for example, the problem relating to when the rate of the channel change is faster than the power control feedback rate can be overcome.

Under varying channel conditions the received SIR is compared to multiple threshold values and based on the comparison a decision of the best-suited step size can be made.

According further to the first aspect of the present invention the "don't care" bit combinations (01 and 10) in the current Release 4 are adapted for different step sizes and thus having a multiple step size scheme with 2-bit signaling scheme. However, the Release 4 (and earlier) equipment would have difficulty to judge the received power control command in particular cases with the power control scheme, according to the present invention, and there would not be any rule or guarantee how the equipment would behave. Equipment not supporting the new power control feature would simply ignore the last bit when judging the power control command and the "don't care" situations "01" and "10" are interpreted as "00"and "11" respectively. Advanced equipment that are capable of signaling multiple step sizes would resume use of the older standard scheme when in an operating environment under the Release 4/99 scheme.

Advantages of this scheme is that it is backward compatible so it works with older release signaling by adopting a choice between a) the receiver of the command ignoring the other bit, or b) the sender of the command resuming to the older signaling scheme, without affecting the slot format or the number of required bits for multiple level signaling.

According to a second aspect of the present invention, a UE signals an appropriate downlink power control step size to the BS based on a difference between a measured downlink SIR and a desired SIR. After UE measures downlink SIR, it calculates the difference between measured SIR and service dependent outer loop SIR target. This SIR difference is then compared to various thresholds so that it can be quantified with certain number of bits. Preferably, a 2-bit scheme is used to render four step sizes possible. In low BER (bit error rate) environments, better performance can be achieved with signaling with three or more bits. However, the volatility when TPC BER above 5% makes these high-bit schemes less attractive. Furthermore, with 2-bit signaling backward compatibility can be maintained.

On the BS side corresponding step size should be selected based on the signaled TPC command. Since TPC bits are not coded, protection against errors can be achieved when higher step sizes are used for UP commands than for DOWN commands. Even though actual selection of step size is channel dependent, there can be seen benefit from setting the UP and DOWN step sizes independently.

This invention presents a method for power control to adapt the changes to channel conditions. As such, better system capacity can be achieved as compared to usage of fixed step size. This method allows flexibility in setting power control step sizes. Thus, the signaling can be optimized for different environments although complexity also increases.

When each of the TPC bits is used for signaling step size from UE to BS, the system is more sensitive to errors in the TPC commands. However, the performance loss can be minimized by selecting higher step sizes for UP commands than for DOWN commands.

According to a third aspect of the present invention, a method is provided to choose the step size values and threshold values for the inner loop power control based on the reported UE SIR measurements.

Step size and threshold selection can be viewed as an optimization problem in matching the propagation conditions. In prior art, the process can be carried out manually in system simulations to optimize the TDD system performance or via measurements carried out during the system set up process. The step size and the threshold value can then be chosen by examining the distribution. However, using such an approach, optimization of the power control step sizes and threshold values for each cell in a cellular system could be a complicated and tedious because the process is propagation environment dependent.

The present invention provides a solution for increasing the system capacity by selecting the step values and threshold based on statistical analysis while the system is running. The advantage of this approach is that the process of gathering the information and then selecting the step sizes is carried out automatically and not manually. The disadvantage is that the accumulation of the data can take a longer time than the manually probing process. Thus, it is possible to obtain optimum cell capacity faster by using a manual probing process.

According to a fourth aspect of the present invention, multiple power control step sizes are needed for providing advanced downlink power control. By using multiple step sizes, adaptive power control schemes can be used to increase the performance of the TDD system. Although BS could be responsible for controlling its own transmission powers, RNC can be used to command the limits for BS. In this way the whole network can be better controlled and compatibility between products of different manufactures can be maintained. Accordingly, the present invention provides a method for signaling multiple step sizes and thresholds, allowing the RNC to control the BSs when multiple power control step sizes are used. It should be noted that signaling can be divided in two parts because UE and BS may need different information. For example, RNC must signal to UE the threshold for SIR comparison so that UE can divide the needed steps. According to current 3GPP specifications, RNC signals DL step size to UE. This signaling procedure can be used to signal the threshold for SIR comparison in UE.

The second part of the signaling procedure is from RNC to BS in order to inform the BS what the step sizes are corresponding to the TPC commands "00", "01", "10" and "11" as signaled by UE, for example. This information signaling can be handled in different ways. Current signaling procedure for signaling step size to BS can be used for signaling multiple step sizes by repeating the message a number of times in order to present the needed steps in the correct format. Alternatively, only the used DL TPC step set number is signaled so that the set number can be used to configure in BS. Another option is to signal the step sizes from RNC to BS with a new message. The fourth option is to signal only minimal information so that only step sizes for UP commands are signaled to BS. As such, BS can generate step sizes for DOWN commands based on predefined assumptions that the step sizes for DOWN commands are lower than those for UP commands.

Furthermore, it is desirable that all the mobile terminals behave in a more consistent way regarding the use of thresholds for generating the TPC bit patterns. It is also desirable that no additional signals are used to indicate the threshold values that the terminal uses for the 4-state TPC. Thus, the fifth aspect of the present invention provides a method of signaling which allows a mobile terminal to generate the TPC bit patterns, wherein the threshold values that are used by the mobile terminal is based on the information in the RRC (radio resource control) signal from UTRAN to UE.

The sixth aspect of the present invention provides a method of signaling between a mobile terminal and a Node B for allowing the Node B to recognize the Release version of the mobile terminal. The method is related to the amount of errors in the TPC commands under the propagation conditions.

Accordingly, the present invention provides a method of adjusting transmission power at a base station in a telecommunication network having a mobile terminal operatively connected to said base station. The method comprises the steps of:

measuring in the mobile terminal a strength of a communication signal in relation to interference in the signal;

comparing in the mobile terminal the measured strength with a referenced strength for providing a difference strength, providing adjustment information based on said comparing so as to allow the base station to adjust the transmission power according to the provided information, wherein the provided information is indicative of one of a plurality of adjustment codes including at least three different adjustment codes.

Preferably, the provided information comprises:

a first adjustment code indicative of a bit pattern of "00" if the measured strength is greater than the referenced strength, and the difference strength is greater than a first selected value;

a second adjustment code indicative of a bit pattern of "01" if the measured strength is greater than the referenced strength, and the difference strength is smaller than a first selected value;

a third adjustment code indicative of a bit pattern of "10" if the measured strength is smaller than the referenced strength, and the difference strength is smaller than a second selected value; and a fourth adjustment code indicative of a bit pattern of "11" if the measured strength is smaller than the referenced strength, and the difference strength is greater than a second selected value.

The referenced strength is a targeted signal-to-inference ratio. Alternatively, the referenced strength is initially predetermined by the network, and then adjusted based on operation conditions. The operation conditions include target block error rate under a channel condition.

In order to be backward compatible, when the base station fails to interpret the second adjustment code or the third adjustment code, the base station equates the second adjustment code to the first adjustment code, and equates the third adjustment code to the fourth adjustment code.

Preferably, the plurality of adjustment codes include four adjustment codes such that if the provided information comprises a first adjustment code, the base station decreases the transmission power according to a first step size;

if the provided information comprises a second adjustment code, the base station decreases the transmission power according to a second step size;

if the provided information comprises a third adjustment code, the base station increases the transmission power according to a third step size; and if the provided information comprises a fourth adjustment code, the base station increases the transmission power according to a fourth step size.

The first step size is greater than the second step size, and the fourth step size is greater the third step size.

Alternatively, the plurality of adjustment codes include 2N codes defined by (2N−1) threshold values, where N is an integer greater than 1, and wherein the provided information is indicative of one the 2N codes. The (2N−1) threshold values can be determined based on statistical data of the measured strength accumulated over a period of time.

The statistical data includes a cumulative distribution function of the measured strength under a channel condition so as to allow the threshold values and the adjustment codes to be selected based on the cumulative distribution function in order to match channel characteristics.

According to the present invention, the telecommunication network comprises a radio network controller for controlling the base station and the mobile terminal, and wherein the radio network controller provides the first and second predetermined values to the mobile terminal for determining the bit pattern, and the radio network controller provides a transmission power control command including an adjustment magnitude to the base station so as to allow the base station to adjust the transmission power based on the adjustment magnitude, wherein the adjustment magnitude is determined based on the bit pattern.

Alternatively, the radio network controller provides a transmission power control (TPC) step size via a transmission power control information element (IE) in a radio resource control (RRC) signal to the mobile terminal so that a sum of the TPC step size and the referenced strength can be used to compute the first selected value, and a difference between the referenced strength and the TPC step size can be used to compute the second selected value.

Advantageously, when the adjustment codes are provided to the base station a transmission power control command, which has a bit error rate due to factors including conditions in the communication channel, the base station adjusts the transmission power based on the second or the third adjustment codes only if a ratio of the second and third adjustment codes provided to the base station over a period of time as compared to all adjustment codes is higher than the bit error rate.

The present invention will become apparent upon reading the description in conjunction with FIGS. 1a to 7.

BRIEF DESCRIPTION OF THE DRAWINGS

FIG. 1a is a schematic representation the preferred multiple level power control command signaling, according to the present invention.

BEST MODE FOR CARRYING OUT THE INVENTION

According to the first aspect of the invention, Table 1 shows a signaling scheme and how the different equipment interprets the commands.

TABLE 1

| Received power control command | Release 4 equipment | Release 5 equipment |
|---|---|---|
| 00 | DOWN | DOWN step size 1 |
| 01 | Judged as DOWN | DOWN step size 2 |
| 11 | UP | UP step size 1 |
| 10 | Judged as UP | UP step size 2 |

DOWN is command that instructs the transmitter to decrease the power.
UP is command that instructs the transmitter to increase the power.

The invention can be implemented with a current transmitter/receiver, but the algorithm making the judgement of the received command should act and change the transmission power accordingly.

Figure 1B:
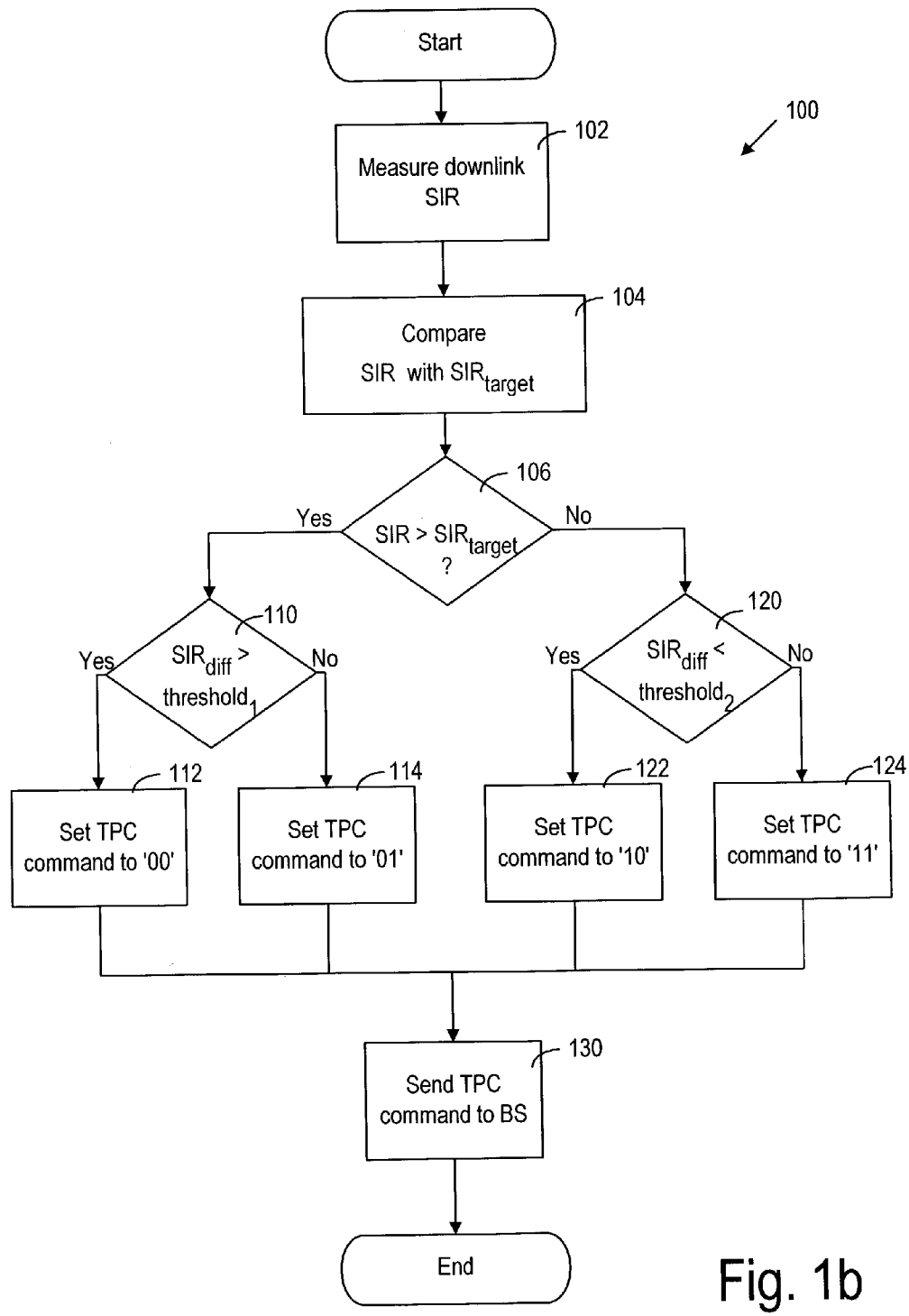
FIG. 1b is a flowchart showing the method of generating TPC command in the UE when two bits are used for signaling the step size to a base station.

Adaptive step size selection for downlink power control contains two parts: one in UE and one in BS. As shown in FIGS. 1a and 1b, on the UE side a difference between a measured downlink SIR and a service dependent outer loop SIR target is calculated. This SIR difference is then used in the step size selection procedure.

When two bits are used for signaling step size to BS, four different step sizes can be presented. Step selection can be carried out as follows.

First, the SIR measured at step 102 is compared to a referenced strength, which can be $SIR_{target}$ or other referenced level at step 104. If it is determined at step 106 that the measured SIR is greater than $SIR_{target}$, as illustrated in the right half of FIG. 1a, then the power control step size should be DOWN. Otherwise the power control step should be UP, as illustrated in the left half of FIG. 1b.

In each command direction, a threshold ($1^{st}$ and $2^{nd}$ selected values in FIG. 1b) is used to determine whether the step size is big or small. If the command direction is DOWN and it is determined at step 110 that $SIR_{diff}$ (or $SIR-SIR_{target}$) is greater than $threshold_1$ ($1^{st}$ selected value), the signaled value should be "00" (see step 112). This means that a big step should be taken to decrease downlink transmission power at BS. This $SIR_{diff}$ is illustrated as the difference strength (d) in FIG. 1a. However, if $SIR_{diff}$ is smaller than $threshold_1$, the signaled value is "01" (see step 114). This means that a small step size should be used for decreasing power at the BS. This $SIR_{diff}$ is illustrated as the difference strength (c) in FIG. 1a. Similarly, a thresholds ($2^{nd}$ selected value in FIG. 1a) is used to compare with $SIR_{diff}$ if the command direction is UP in order to assign the signaled value to "10" for a small increased power step or "11" for a big increased power step (see steps 120, 122, 124 in FIG. 1b, and the difference strength (b) and (a) in FIG. 1a.

Different thresholds can be selected according to different channel/environment conditions. It is possible that the number of signaled values for the UP command is different from the number of signaled values for the DOWN command. For example, when two bits are used for presenting signaled values, one step size is used for DOWN direction and three step sizes are used for UP direction.

Figure 2:
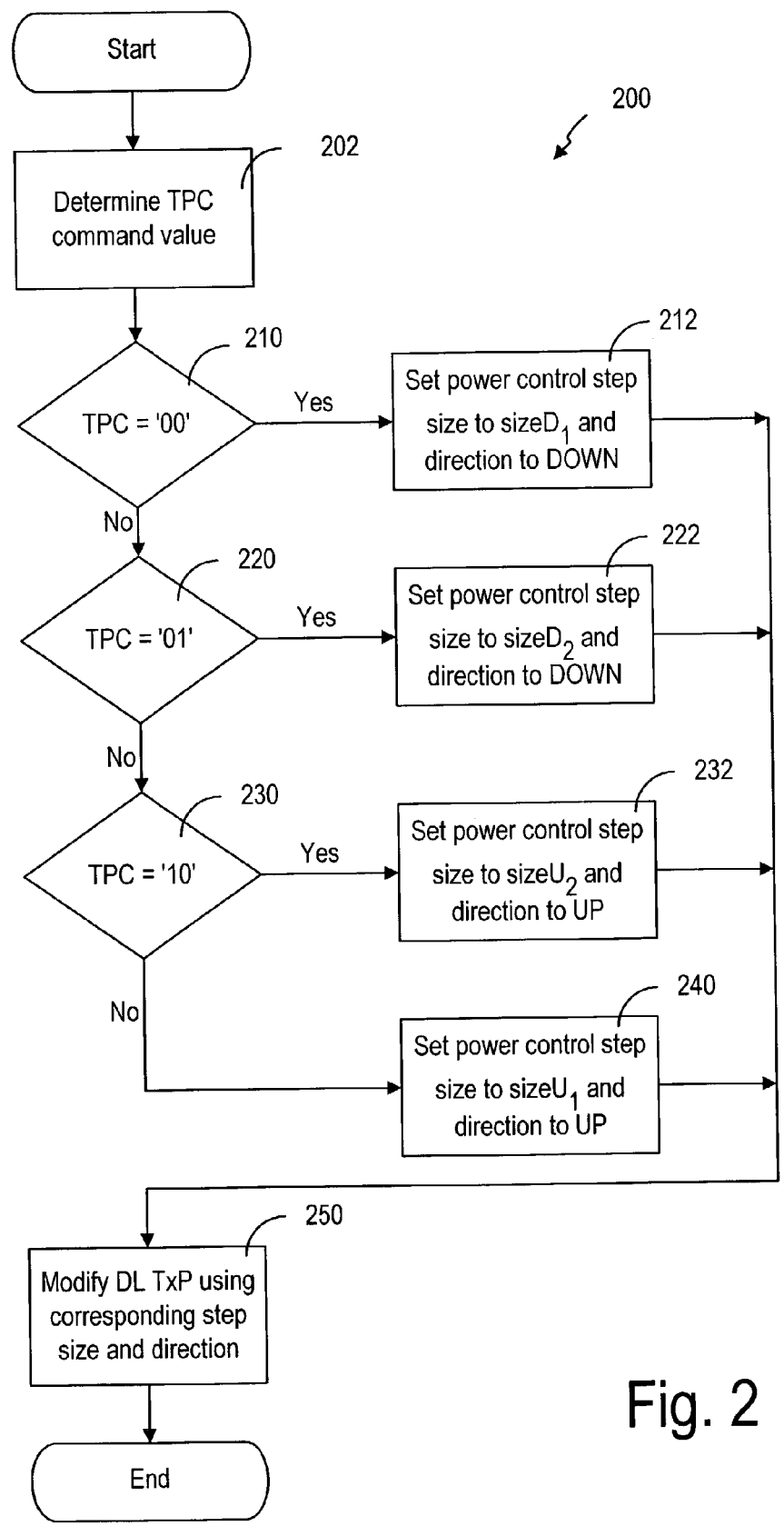
FIG. 2 is a flowchart showing the step size selection process in the base station based on the received TPC command.

In the BS, step size is selected according to received TPC command. For each signaled value there exists a number of predefined step sizes, which are defined separately for UP and DOWN commands. Available step sizes are listed in decreasing order, as shown in FIG. 2. For example, when the BS receives a TPC command, it determines, at step 202, the TPC command value. If the TPC command value is equal to "00", then the BS sets the power step size, at step 212, to size $D_1$, a big step for the DOWN direction. Otherwise the BS determines, at step 220, to see whether the TPC command value is equal to "01". If the TPC command value is equal to "01", then the BS sets the power step size, at step 222, to $sizeD_2$, which is smaller than $sizeD_1$ for the DOWN direction, where the step size, is larger than $sizeD_2$. Otherwise, at step 230, the BS determines whether the TPC command value is equal to "10" and sets power control step size, at step 232, to $sizeU_2$ for the UP direction or at step 240 to $sizeU_1$, for the UP direction, where the step size $sizeD_1$ is larger than $sizeD_2$. The BS adjusts the downlink transmit power at step 250 accordingly. Step sizes can be optimized in the BS and the step size pool can be different although the thresholds are not changed in the UE. By setting higher values for UP command than those for DOWN commands, this approach can be used to minimize the capacity loss due to erroneous TPC commands.

On the UE side, additional TPC generation algorithms are needed so that the SIR difference can be compared against various thresholds. On the BS side, the TPC command extraction algorithm may be changed so that it can detect multiple thresholds. Also, the BS should be able to use multiple step sizes.

Figure 3:
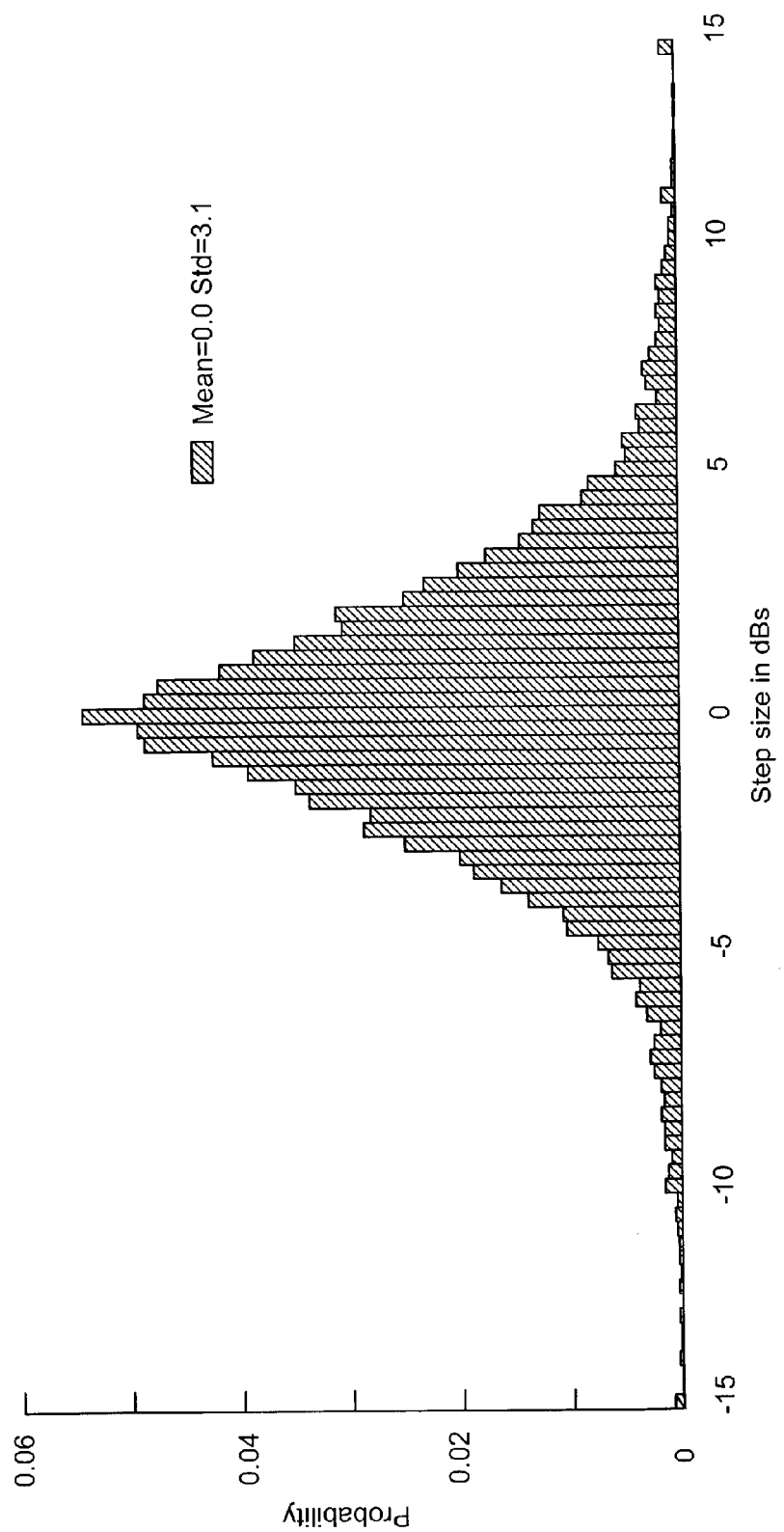
FIG. 3 is a chart showing a distribution of SIR difference between UE measured and reported value to the averaged SIR for a particular service.

According to one aspect of the present invention, the step size values and the threshold values for inner loop power control are chosen based on the reported UE SIR measurements. The method is related to method where multiple step sizes (more than 1) are used for UP and DOWN commands. With this power control scheme there are 2n−1 threshold values and 2n step sizes to be chosen for each n-ary power control scheme. In particular, the present invention proposes certain parameter values for the 2-bit scheme. Based on the UE reported SIR values as compared to the average SIR value that is needed to support the service in the particular cell, a distribution of the SIR difference is created. A distribution of UE reported SIR difference between UE measured and reported value to the averaged SIR for a particular service is shown in FIG. 3. It is assumed that the SIR difference between UE observed SIR and $SIR_{target}$ could be used to choose the optimum step size to compensate the path loss.

Figure 4:
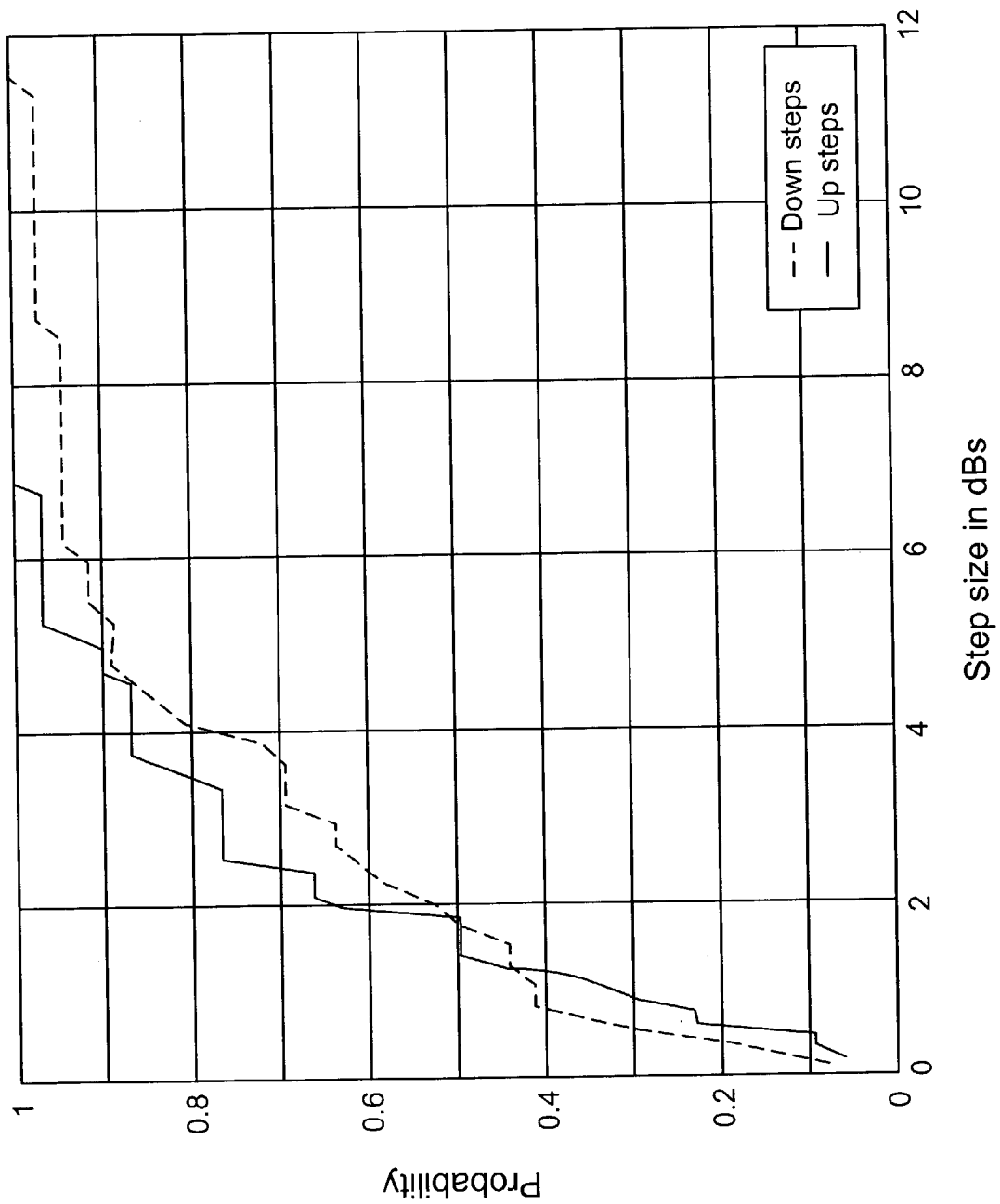
FIG. 4 is a chart showing a cumulative distribution function of power control steps that would have been selected based on SIR differences.

As more SIR differences are collected, a cumulative distribution function (CDF) of the SIR difference can be obtained. Accordingly, the threshold values for the transmission power control commands and the appropriate step sizes can be selected from the CDF. A CDF of power control steps that can be selected based on SIR differences is shown in FIG. 4. The CDF is calculated for a particular cell for compensating the path loss variation in downlink based on the SIR difference measured.

In a 2-bit scheme it is proposed that the threshold values at the UE for defining TPC command are chosen to be 0% CDF for defining step direction (UP or DOWN command) and 50% CDF for defining either smaller or bigger step size. The step sizes at the base station are chosen to be 50% and 90% for the UP command and 40% and 60% for DOWN command. These particular parameter values are chosen based on the system simulations run in one particular environment, but the selection criteria for the parameter values is assumed to be environment independent.

Figure 5:
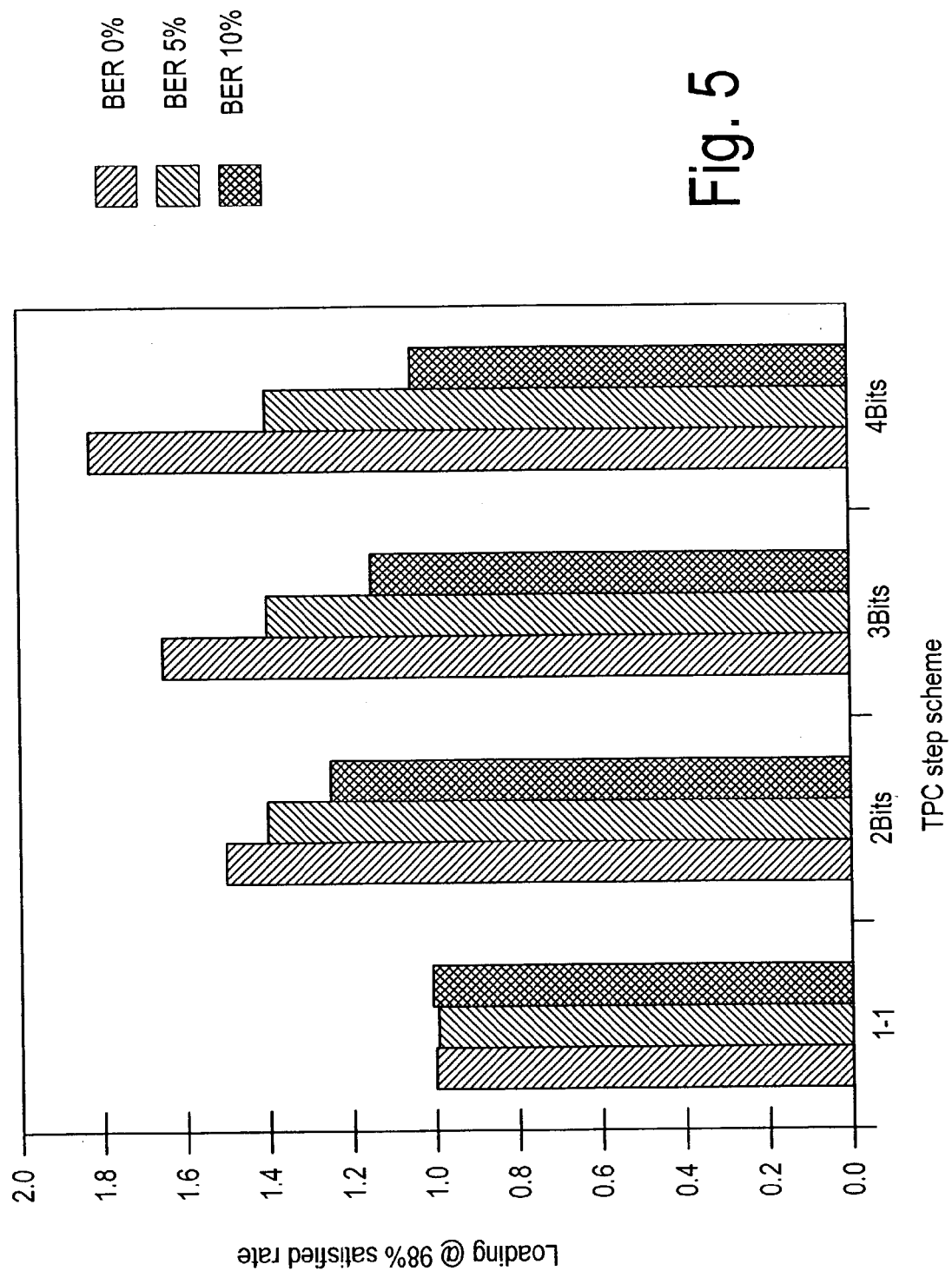
FIG. 5 is a chart showing the results from dynamic system simulation with four base station indoor scenario, regarding TPC error impact to system capacity with signaled steps.

FIG. 5 illustrates results from dynamic system simulation in a four base station indoor scenario, regarding the TPC error impact to system capacity with signaled steps. It shows the loading of the system relative to the case with 1 dB step size. With the 2-bit power control step size signaling, capacity gain of 24 to 52 percent can be achieved. This chart shows the motivation for a 2-bit signaling scheme. Based on these results it can be concluded that 4 values for the DL TPC steps are preferred to obtain good system performance under the current operation scenario. Table 2 summarizes parameters in the above-mentioned simulation regarding the step selection.

TABLE 2

| TPC step scheme | Step sizes for up step [dB] | Step sizes for down step [dB] |
| --- | --- | --- |
| 1 Bit | 1 | 1 |
| 2 Bits | 2, 4 | 1, 3 |
| 3 Bits | 2, 4, 6, 8 | 1, 3, 5, 7 |
| 4 Bits | 1, 2, 3, 4, 5, 6, 7, 8 | 1, 2, 3, 4, 5, 6, 7, 8 |

Figure 6:
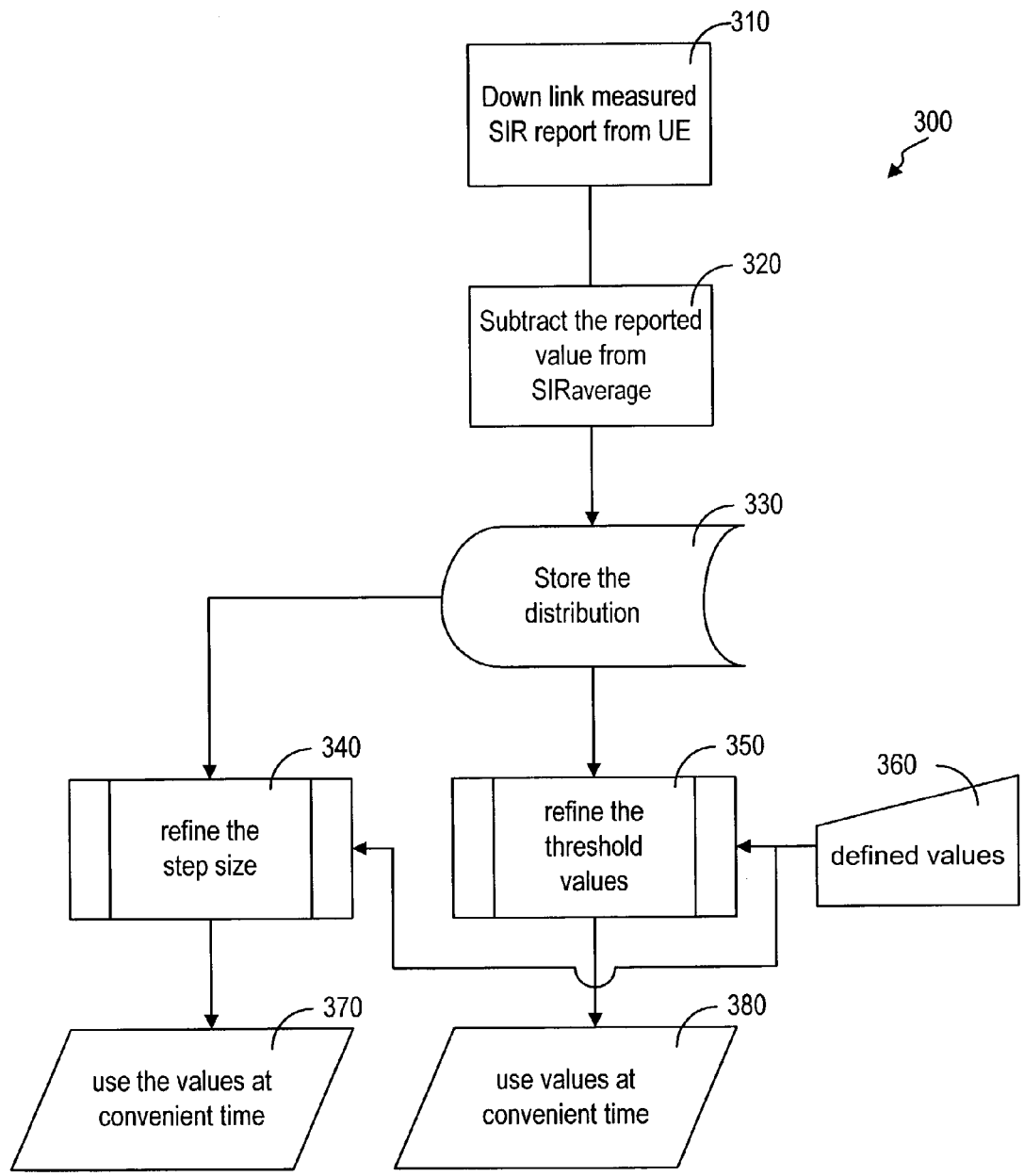
FIG. 6 shows a flow chart of the process carried out in the BS to refine step sizes and threshold values.

It should be noted that the step sizes and the threshold values can be refined based on the distribution of SIR difference between UE measured and reported value and the averaged SIR value. A flowchart 300 of the process for refining step sizes and threshold values is shown in FIG. 6. In the flowchart 300, the base station receives the downlink measured SIR that is reported from the UE at step 310. The base station, at step 320, calculates the SIR difference by subtract the reported SIR value from an average SIR value that is needed to support support the service in the particular cell. A distribution of the SIR difference is created and stored at step 330. Based on the cumulative distribution of SIR difference, the defined threshold values and step size stored in block 360 are refined at step 350 and step 340, respectively. The refined values are used in the transmission power control at steps 380 and 370.

The invention can be implemented to a base station controller or to base station depending on the selected architecture. The method requires memory and algorithms to calculate the appropriate values for the step size and thresholds.

Referring back to FIG. 1b, it will be appreciated that FIG. 1b presents a flowchart of TPC command generation in the UE when two bits are used for signaling the step size to BS. Two thresholds are used at the UE. However, it is possible that only one threshold is needed to signal from RNC to UE.

Again, FIG. 2 presents step size selection based on the received TPC command in the BS. For each signaled value there exists a corresponding step size, which is signaled from RNC to BS.

Preferably, two bits are used to present four step sizes for the TPC command signaling from UE to BS. The used power control steps can be presented by repeating the step size signaling from RNC to BS four times. The repeating step size signaling can be carried out in the following order: the big step size for DOWN command, the small step size for DOWN command, the big step size for UP command and then the small step size for UP command. As such, step size can be set independently for UP and DOWN commands. Similar order can also be used if step sizes are configured with new message from RNC to BS.

This aspect of the invention can be implemented in RNC and in BS. However, the signaling procedure in UE implementation does not need changes.

To make sure that all the terminals behave in a more consistent way as to the adjustment of transmission power at the base station, it is desirable that the thresholds for generating the TPC bit patterns are similar among the mobile terminals.

Figure 7:
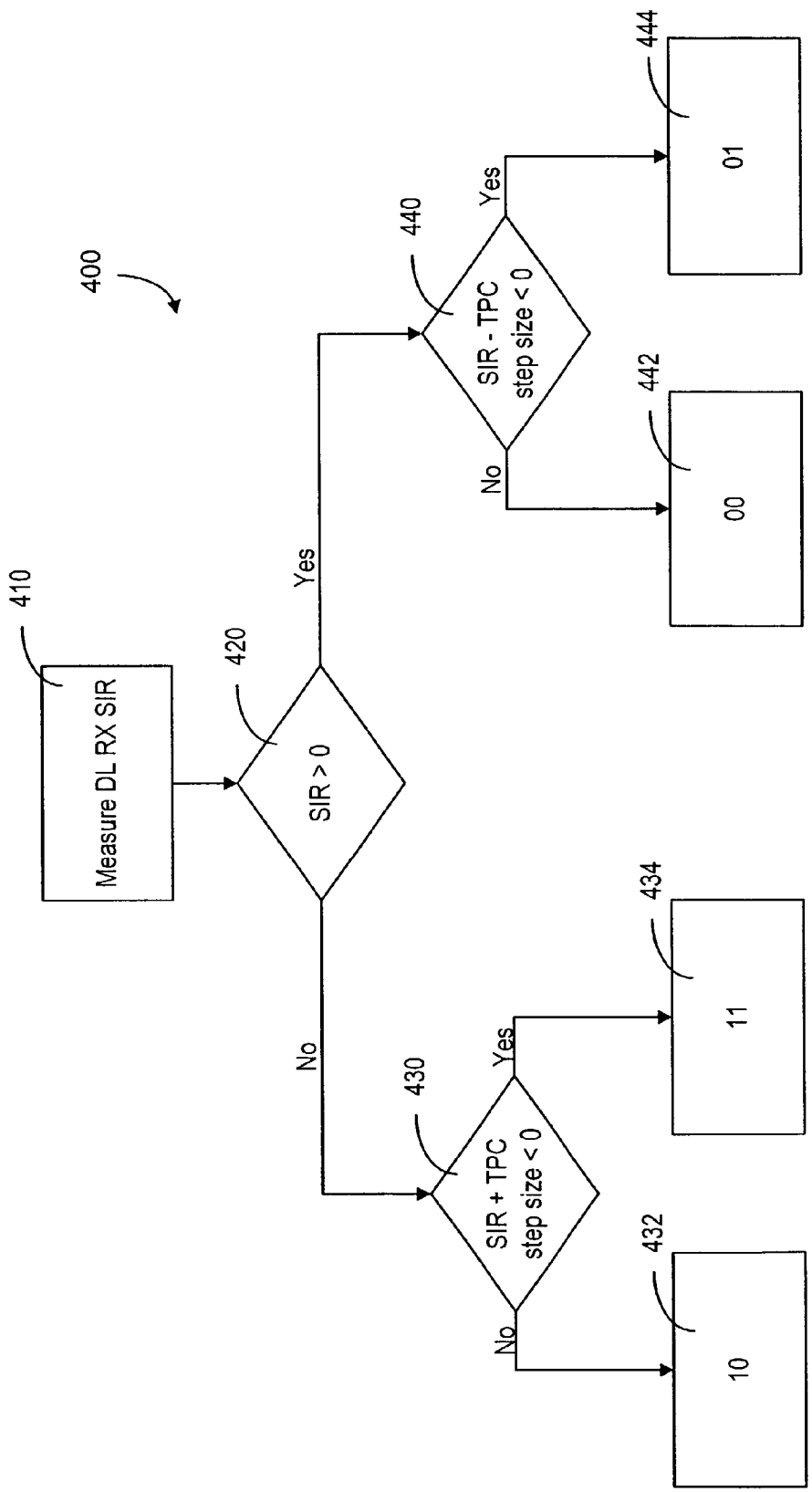
FIG. 7 presents flowchart of TPC command generation in the UE based on the received downlink SIR.

As shown in FIG. 7, SIR is used for TPC command generation in the UE. According to the flowchart 400, the UE measures the downlink received SIR at step 410. When the SIR is high, as determined at step 420, the transmission power at a base station should be reduced, as illustrated in the right half of FIG. 7. When the SIR is low, the transmission power at the base station should be increased, as illustrated in the left half of FIG. 7. However, the increase is in a smaller step if (SIR+TPC step size) is greater than a first predetermined value, as illustrated at steps 430 and 432. Otherwise a big step in power increase should be used, as illustrated at step 434. Similarly, the reduction is in a smaller step if (SIR−TPC step size) is smaller than a second predetermined value, as illustrated at steps 440 and 444. Otherwise a big step in power reduction should be used, as illustrated in step 442. The first and second predetermined values can be zero, for example.

It should be noted that the TPC information, or Information Element (IE) in RRC signal that is used to communicate the TPC step size from UTRAN to UE can be used implicitly to indicate the thresholds. As such, the thresholds for TPC bit generation are based on the $SIR_{target}$ that is derived in the same manner as the Release 4 specification. Here the lower boundary is ($SIR_{target}$−TPC step size) and the threshold is ($SIR_{target}$+TPC step size).

The terminal sends only two bits TPC command to a base station. In a Release 6 terminal, "11" means "to increase the transmission power with a big step", "10" means "to increase the transmission power with a small step", "01" means "to decrease the power in a small step" and "00" means "to decrease the power in a big step". In the older Release 99/4/5, there are only two states: "11" means power increase (UP) and "00" means power reduction (DOWN). The 10 and 01 states are considered as errors.

Based on link level simulations, TPC BER varies between 2% and 4% depending on target BLER (block error ate) under certain channel conditions. It is possible to use this statistical value to indicate whether the terminal is a Release 6 terminal a Release 99/4/5 terminal. If a terminal uses a certain percentage of all TPC commands to signal the TPC commands "10" and "01", and this percentage is higher than the typical TPC BER, then the presence of the "01" and "10" states can be interpreted as the correct TPC commands and not due to errors. In that case, the terminal is a Release 6 terminal.

Thus, it is possible to set a predetermined value, which is higher than the typical TPC BER, so as to allow a Node B to recognize whether the terminal is of Release 6 or of an older Release based on the predetermined value. By storing the transmission power control bits overtime and comparing the amount of each 4 possible states to the predetermined value, a Node B can distinguish a real TPC BER (from an old Release) from a deliberate TPC command from a Release 6 terminal. It should be noted that the probability distribution of the different stages ("00", "01", "10", "11") depends on the channel conditions and these states are not equally probable. Furthermore, the TPC BER varies with propagation conditions. Nevertheless, as the received DL SIR has certain average and deviation, this scheme benefits from the fact that "01" and "10" are more likely in the channel that would benefit from the scheme most. Should the DL RX SIR deviation be large, the benefit from using the intermediate step sizes is questionable. In that situation, the UTRAN can automatically assume that Release 4 scheme is better suited for such channel conditions.

The present invention provides a method for signaling of the optimum step size that would require large bandwidth for granularity. The present invention also solves the problem of maintaining backward compatibility with previous releases that use 2-bit signaling with one threshold value. The disadvantage of this scheme is that it has limited range and granularity as compared to the optimum scheme that would have large number of step sizes, but the loss by adopting 2 quantized or digital steps for UP/DOWN can be minimized by choosing the optimum step sizes for each propagation environment.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for adjusting transmission power at a base station in a telecommunication network having a mobile terminal operatively connected to the base station, said method comprising
   measuring in the mobile terminal a strength of a communication signal in relation to interference in the signal;
   comparing in the mobile terminal the measured strength with a referenced strength,
   providing adjustment information based on said comparing so as to allow the base station to adjust the transmission power according to the provided information, wherein the provided information is indicative of one of a plurality of adjustment codes including more than two different adjustment codes, wherein a difference strength is provided in response to said comparing, and the provided information comprises:
   a first adjustment code indicative of a bit pattern of "00" if the measured strength is greater than the referenced strength, and the difference strength is greater than a first selected value;
   a second adjustment code indicative of a bit pattern of "01" if the measured strength is greater than the referenced strength, and the difference strength is smaller than a first selected value;

a third adjustment code indicative of a bit pattern of "10" if the measured strength is smaller than the referenced strength, and the difference strength is smaller than a second selected value; and a fourth adjustment code indicative of a bit pattern of "11" if the measured strength is smaller than the referenced strength, and the difference strength is greater than a second selected value.

2. The method of claim 1, wherein the measured strength is signal-to-interference ratio.

3. The method of claim 1, wherein the referenced strength is a targeted signal-to-inference ratio.

4. The method of claim 1, wherein the referenced strength is initially pre-determined by the network, said method further comprising adjusting the referenced strength based on operation conditions.

5. The method of claim 4, wherein said operation conditions include target block error rate under a channel condition.

6. The method of claim 1, wherein the plurality of adjustment codes include four adjustment codes such that if the provided information comprises a first adjustment code, the base station decreases the transmission power according to a first step size;

if the provided information comprises a second adjustment code, the base station decreases the transmission power according to a second step size;

if the provided information comprises a third adjustment code, the base station increases the transmission power according to a third step size; and if the provided information comprises a fourth adjustment code, the base station increases the transmission power according to a fourth step size.

7. The method of claim 6, wherein the adjustment codes are defined such that the first step size is greater than the second step size; and
the fourth step size is greater than the third step size.

8. The method of claim 1, wherein the plurality of adjustment codes include 2N codes defined by (2N−1) threshold values, where N is an integer greater than 1, and wherein said (2N−1) threshold values are determined based on statistical data of the measured strength accumulated over a period of time.

9. The method of claim 8, wherein said statistical data includes a cumulative distribution function of the measured strength under a channel condition so as to allow the threshold values and the adjustment codes to be selected based on the cumulative distribution function in order to match channel characteristics.

10. The method of claim 1, wherein the telecommunication network comprises a radio network controller for controlling the base station and the mobile terminal, and wherein the radio network controller provides the first and second predetermined values to the mobile terminal for determining the bit pattern, and the radio network controller provides a transmission power control command including an adjustment magnitude to the base station so as to allow the base station to adjust the transmission power based on the adjustment magnitude, wherein the adjustment magnitude is determined based on the bit pattern.

11. The method of claim 1, wherein the telecommunication network comprises a radio network controller for controlling the base station and the mobile terminal, and wherein the radio network controller provides a transmission power control (TPC) step size via a transmission power control information element (IE) in a radio resource control (RRC) signal to the mobile terminal so that a sum of the TPC step size and the referenced strength can be used to compute the first selected value, and a difference between the referenced strength and the TPC step size can be used to compute the second selected value.

12. The method of claim 1, wherein the terminal provides to the base station a total number of adjustment codes contained in the provide information over a period of time, the total number of the adjustment codes including a sub-number of second and third adjustment codes contained in the provide information over said period of time, and wherein the adjustment codes are provided to the base station via a transmission power control command, which has a bit error rate due to factors including conditions in a communication channel of the telecommunication network, and wherein the base station adjusts the transmission power based on the second or the third adjustment codes only if a ratio of the sub-number to the total number is significantly higher than the bit error rate in the transmission power control command.

13. The method of claim 1, wherein the measured strength is measured based on a downlink signal-to-interference ratio and the referenced strength comprises a service dependent outer-loop signal-to-interference ratio.

* * * * *